140 — COATING OR PLASTIC.

UNITED STATES PATENT OFFICE.

LOGAN WALLER PAGE, OF WASHINGTON, DISTRICT OF COLUMBIA.

PROCESS FOR MIXING AND PREPARING HYDRAULIC CEMENT CONCRETE AND THE PRODUCT THEREOF.

1,000,545. Specification of Letters Patent. Patented Aug. 15, 1911.

No Drawing. Application filed April 26, 1911. Serial No. 623,804.

(DEDICATED TO THE PUBLIC.)

*To all whom it may concern:*

Be it known that I, LOGAN WALLER PAGE, a citizen of the United States, residing in the city of Washington, District of Columbia, and an officer of the Department of Agriculture of the United States of America, whose post-office address is Washington, District of Columbia, have invented a new and useful Process for Mixing and Preparing Hydraulic Cement Concrete and the Product Thereof, of which the following is a specification.

This application is made under the act of March 3, 1883, chapter 143 (22 Stat., 625), and the invention herein described and claimed may be used by the Government of the United States or any of its officers or employees in the prosecution of work for the United States, or by any person in the United States, without the payment of any royalty thereon.

The invention relates to the process of mixing or mingling a non-volatile mineral oil or oil residuum preferably such as have a sticky or greasy base sufficiently viscous or fluid to flow readily, with ordinary cement mortar or concrete mixtures before they have hardened into a rock-like substance.

My invention has for its object an improvement in the final product formed after the hydraulic cement mixtures or concrete mixtures have set and hardened in the usual well-known manner.

It has heretofore been believed that the intermingling of oil with cement or cement concrete before these materials have hardened, in such a way as to bring about an improvement in the final product, was impracticable. I have discovered that this intermingling of oil and oil residuum (and I may use the term oil throughout to include both) can be done without materially interfering with the natural hardening properties of the hydraulic cement, and that the hardened product produced by my method is better adapted than ordinary cement concrete for many of the ordinary uses to which such material has been put. To cite specifically the improvement in my method over others of a similar character I may state that I have discovered that such mixtures yield products more impervious and resistant to the action of water than ordinary cement concrete, and furthermore, that the products obtained by my method when I use a tough oil are more resilient and tougher.

I consider my invention particularly well adapted for waterproofing and for the construction of road surfaces, but I do not confine its use to those particular purposes, as the same is adapted for use for any purpose which requires the use of waterproofed material.

In carrying out my process I may operate to bring about the desired result, as hereinafter explained. The cement of the usual mixture of cement and sand or the mixture of cement, sand and broken stone, or other mineral aggregates such as gravel, is mixed or tempered with a suitable amount of water to the desired consistency in the usual well-known way. When this mixture has been brought to a homogeneous condition a suitable quantity of the oil, or oil residuum, is poured on or into the mixture which is then mixed in the usual way and until the resulting mass is again rendered homogeneous. I produce an emulsion of the oil and the emulsification should itself be effected in the concrete immediately after mixing, the free alkali present acting as an emulsifier. Alkali is usually present in cement in quantity sufficient to effect this emulsification. If not, a little alkali may be added before mixing the concrete. The oil then emulsifies rapidly and thoroughly mixes with the other ingredients and becomes permanently and evenly incorporated therewith. This homogeneous mass is then to be used in any manner desired or according to the methods in common use for laying or molding ordinary cement concrete.

I prefer to use a quantity of oil equal to from 5 to 25 per cent. of the weight of cement used, but I do not limit myself to these proportions inasmuch as in some cases I may prefer to use either less or more.

I may in some instances add the oil to the water, preferably made alkaline, before the latter is added to the concrete.

The proportion of oil may vary within wide limits. The repellent nature of the oil or bitumen keeps the concrete waterproof and its toughness when a suitable oil is used gives the same quality to the concrete. The bitumen or oil fills the voids left by the set cement binder and to a greater or less extent possibly helps to hold together the sand aggregate. I may in many cases get a result sufficiently good by using too little oil or bitumen to effect completely the filled result indicated. If I use too much, on the other hand, I am apt to interfere with the proper setting of the cement as particles of the latter may be thus isolated, floating as it were in a menstruum of the oil. The proportion of oil is dependent upon the purpose for which it is to be used. The greater the amount of oil or residium the more resistant will be the concrete to the permeability of water and the character and consistency of the oil should be selected according to the use to which the resulting concrete is to be subjected.

It has been shown by experiment that mineral oils with a high flash point are preferable, those of the non-volatile variety being preferable.

Although Portland cement has been chiefly referred to, I have discovered that oil of the kind indicated can be added with similarly good results to all other cements and mortars having hydraulic qualities and which give an alkaline reaction such as hydraulic lime, natural cement, plaster of Paris, oxychlorid of magnesia and alkaline silicate.

Having thus described my invention, what I claim is:

1. The process of preparing hydraulic cement concrete which consists in mixing cement, sand, aggregate and water in the usual way and then adding to such mixture before it begins to set a quantity of nonvolatile mineral oil.

2. The process of preparing a hydraulic cement mixture which consists in mixing the cement with water in the usual way and in then adding thereto, before it begins to set, a quantity of non-volatile mineral oil.

3. The process of preparing hydraulic cement concrete which consists in mixing cement, sand, aggregate and water in the usual way and in then adding to such mixture before it begins to set a non-volatile mineral oil in quantity not exceeding twenty-five per cent. of the cement.

4. The product which consists in a set hydraulic cement concrete containing a non-volatile mineral oil, the oil having been added after the concrete was mixed and before it began to set.

5. The product which consists in a set cement aggregate containing a non-volatile mineral oil, the oil having been added after the cement, sand, and aggregate have been mixed with water and before the cement began to set.

In testimony whereof I affix my signature in the presence of two subscribed witnesses.

LOGAN WALLER PAGE.

Witnesses:
PAUL D. SARGENT,
J. M. BECHTOLD.

---

Copies of this patent may be obtained for five cents each, by addressing the "Commissioner of Patents, Washington, D. C."